United States Patent
Cheng et al.

(10) Patent No.: US 10,705,501 B2
(45) Date of Patent: Jul. 7, 2020

(54) MATCHING RECOGNITION METHOD AND SYSTEM FOR NC PROGRAM AND CORRESPONDING CUTTING TOOLS OF MACHINE TOOLS

(71) Applicant: INDUSTRIAL TECHNOLOGY RESEARCH INSTITUTE, Hsinchu (TW)

(72) Inventors: Chih-Ping Cheng, Miaoli County (TW); Chu-Kai Huang, Changhua County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 0 days.

(21) Appl. No.: 16/210,138

(22) Filed: Dec. 5, 2018

(65) Prior Publication Data

US 2020/0117161 A1 Apr. 16, 2020

(30) Foreign Application Priority Data

Oct. 12, 2018 (TW) .............................. 107135914 A

(51) Int. Cl.
 *G05B 19/18* (2006.01)
 *G05B 19/401* (2006.01)
 *G06K 9/46* (2006.01)

(52) U.S. Cl.
 CPC ......... *G05B 19/182* (2013.01); *G05B 19/401* (2013.01); *G06K 9/4604* (2013.01);
 (Continued)

(58) Field of Classification Search
 CPC ................ G05B 19/182; G05B 19/401; G05B 2219/37618; G05B 2219/49336; G05B 2219/37555; G06K 9/4604
 See application file for complete search history.

(56) References Cited

U.S. PATENT DOCUMENTS 4,631,465 A * 12/1986 Fukuyama ......... G05B 19/4069
 318/565
4,742,470 A 5/1988 Juengel
 (Continued)

FOREIGN PATENT DOCUMENTS

CN 101549468 A 10/2009
CN 106527180 A 3/2017
 (Continued)

OTHER PUBLICATIONS

Taiwan Patent Office, "Office Action", dated Mar. 4, 2019, Taiwan.
 (Continued)

*Primary Examiner* — M. N. Von Buhr
(74) *Attorney, Agent, or Firm* — Locke Lord LLP; Tim Tingkang Xia, Esq.

(57) ABSTRACT

A matching recognition method for an NC program and corresponding cutting tools includes a step of using an imaging device to capture 2-dimensional images from the cutting tools mounted at the corresponding numbered tool holders on a machine tool, a step of based on the 2-dimensional images to extract outline feature points and assembling postures of cutting tools and converting into corresponding tool-assembling strings, a step of obtaining tool demands from each of the sequential machining steps in the NC program and converting into corresponding stepwise tool-demanding strings, and a step of performing matching upon the tool-assembling strings and the stepwise tool-demanding strings to generate and output corresponding step-and-tool matching strings. In addition, an associated matching recognition system is provided to include an imaging device, an image-processing module, a step-decoding module and a matching and comparing module.

14 Claims, 11 Drawing Sheets

(52) U.S. Cl.
CPC .............. *G05B 2219/37555* (2013.01); *G05B 2219/37618* (2013.01); *G05B 2219/49336* (2013.01)

(56) References Cited

U.S. PATENT DOCUMENTS

| | | | |
|---|---|---|---|
| 4,922,440 A | 5/1990 | Kawamura et al. | |
| 5,289,382 A * | 2/1994 | Goto | G05B 19/4207 700/179 |
| 5,752,790 A | 5/1998 | Szczepanski | |
| 5,798,928 A * | 8/1998 | Niwa | G05B 19/40938 700/180 |
| 5,933,353 A * | 8/1999 | Abriam | G05B 19/4097 700/171 |
| 6,401,004 B1 * | 6/2002 | Yamazaki | G05B 19/40937 700/159 |
| 6,583,883 B2 | 6/2003 | Egelhof | |
| 6,647,840 B2 | 11/2003 | Luik | |
| 6,930,461 B2 * | 8/2005 | Rutkowski | G05B 19/40937 318/567 |
| 7,027,889 B2 * | 4/2006 | Nakamura | G05B 19/4097 700/173 |
| 7,266,420 B2 | 9/2007 | Budd | |
| 7,684,891 B2 * | 3/2010 | Okrongli | G05B 19/4083 234/13 |
| 7,949,422 B1 * | 5/2011 | Little | G05B 19/056 700/17 |
| 8,355,813 B2 | 1/2013 | Mori et al. | |
| 8,393,836 B2 | 3/2013 | Wang | |
| 8,522,654 B2 | 9/2013 | Akiyama et al. | |
| 8,588,957 B2 * | 11/2013 | Patry | G05B 19/406 700/105 |
| 8,872,913 B2 | 10/2014 | Wang et al. | |
| 8,925,433 B2 | 1/2015 | Stellmann | |
| 9,229,444 B2 * | 1/2016 | Baierl-Moehler | G05B 19/40938 |
| 9,494,614 B2 | 11/2016 | Passini et al. | |
| 9,547,301 B2 | 1/2017 | Seya et al. | |
| 9,573,181 B2 | 2/2017 | Costa | |
| 9,962,800 B2 * | 5/2018 | Nishioka | B23Q 3/15706 |
| 2014/0148939 A1 * | 5/2014 | Nakano | B23Q 17/2414 700/166 |
| 2015/0066194 A1 | 3/2015 | Chang et al. | |
| 2015/0134101 A1 * | 5/2015 | Iuchi | G05B 19/4086 700/160 |
| 2015/0220077 A1 * | 8/2015 | Reiser | G05B 19/401 700/114 |
| 2015/0277419 A1 * | 10/2015 | Sato | B23Q 15/013 700/114 |
| 2016/0187871 A1 * | 6/2016 | Yi | B23Q 1/0045 700/173 |
| 2018/0068203 A1 * | 3/2018 | Nogami | G06K 9/6201 |
| 2018/0250783 A1 * | 9/2018 | Inaba | B23Q 17/2404 |
| 2018/0259935 A1 * | 9/2018 | Saitou | G05B 19/4097 |
| 2018/0373226 A1 * | 12/2018 | Ootomo | G05B 19/4097 |

FOREIGN PATENT DOCUMENTS

| | | |
|---|---|---|
| CN | 107272574 A | 10/2017 |
| EP | 1424656 A2 | 6/2004 |
| JP | 1015782 A | 1/1998 |
| JP | 2006334684 A | 12/2006 |
| JP | 2014163807 A | 9/2014 |
| TW | 201523181 A | 6/2015 |
| TW | 201525633 A | 7/2015 |
| TW | I496638 B | 8/2015 |
| TW | I605905 B | 11/2017 |

OTHER PUBLICATIONS

Yu Zhou et al., ENN-based recognition method for tool cutting state, Journal of Computational Science, 2018, 27, 418-427.

M. Hassan et al., Benchmarking of Pattern Recognition Techniques for Online Tool Wear Detection, Procedia CIRP, 2018, 72, 1451-1456.

Tomasz Les et al., Automatic recognition of industrial tools using artificial intelligence approach, Expert Systems with Applications, 2013, 40, 4777-4784.

Nanhong Lu et al, Cutting Tool Condition Recognition in NC Machining Process of Structural Parts Based on Machining Features, Procedia CIRP, 2016, 56, 321-325.

Ge Liling et al., Study of CCD vision-based monitoring system for NC lathes, Measurement, 2018, 125, 680-686.

X. Yan et al., Recognition of machining features and feature topologies from NC programs, Computer-Aided Design, 2000, 32, 605-616.

* cited by examiner

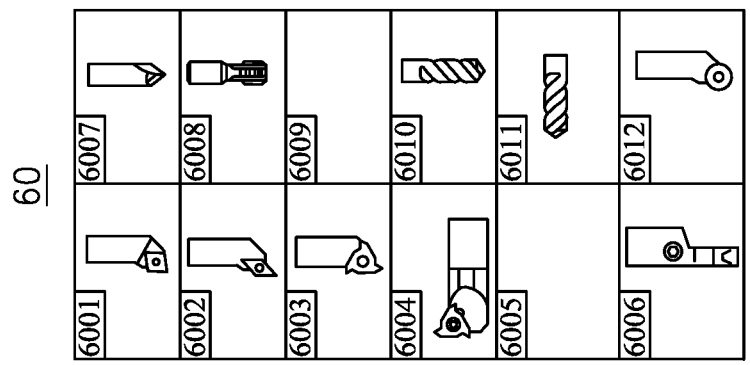
FIG. 3A
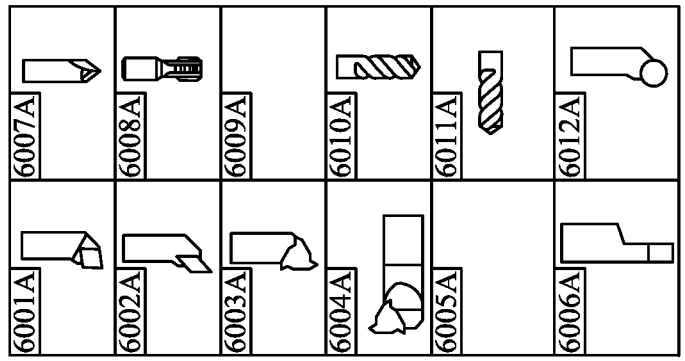
FIG. 3B
| | Numbered tool holder | Type of cutting tool | Specification of cutting tool | Tip direction of cutting tool | Posture of cutting tool |
|---|---|---|---|---|---|
| 101A01 | 01 | 3101 | 16 | 03 | 0 |
| 101A02 | 02 | 3203 | 10 | 03 | 0 |
| 101A03 | 03 | 6101 | 01 | 08 | 0 |
| 101A04 | 04 | 6201 | 01 | 06 | 1 |
| 101A05 | 05 | 0000 | 00 | 00 | 0 |
| 101A06 | 06 | 5101 | 04 | 08 | 0 |
| 101A07 | 07 | 1301 | 03 | 08 | 0 |
| 101A08 | 08 | 7101 | 06 | 08 | 0 |
| 101A09 | 09 | 0000 | 00 | 00 | 0 |
| 101A10 | 10 | 1101 | 05 | 08 | 0 |
| 101A11 | 11 | 1101 | 05 | 07 | 1 |
| 101A12 | 12 | 3505 | 16 | 08 | 0 |
FIG. 3C

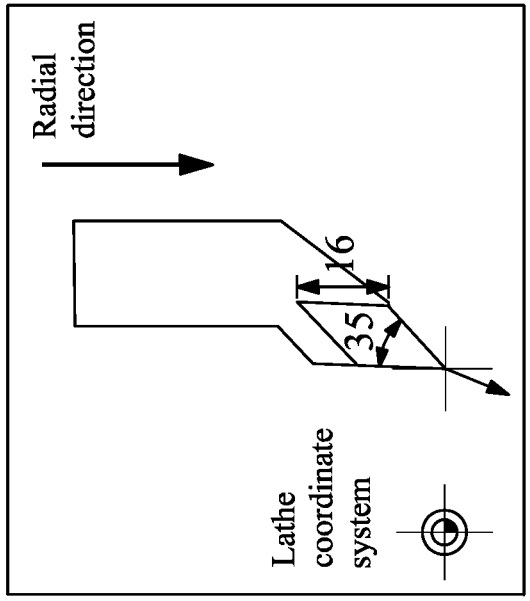
FIG. 4C
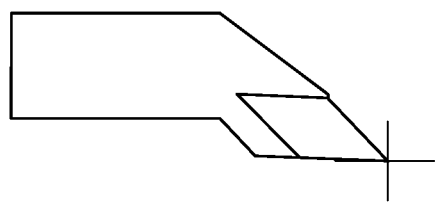
FIG. 4B
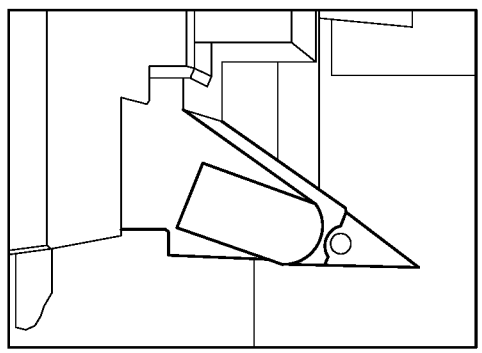
FIG. 4A
FIG. 4D

| | Machining step number | Numbered tool holder | Type of cutting tool | Specification of cutting tool | Tip direction of cutting tool | Posture of cutting tool |
|---|---|---|---|---|---|---|
| 102A01 | N1 | 01 | 3101 | 16 | 03 | 0 |
| 102A02 | N2 | 06 | 5101 | 04 | 08 | 0 |
| 102A03 | N3 | 04 | 6201 | 16 | 06 | 1 |
| 102A04 | N4 | 11 | 1101 | 05 | 07 | 1 |
| 102A05 | N5 | 10 | 1101 | 05 | 08 | 0 |

| | |
|---|---|
| 52A01 | N1(S1_Outside_Transverse_V_insert_16)<br>T0101<br>G96 S200 M3<br>G0 X100. Z5.<br>G71 U2. R0.5<br>G71 P10 Q20 U0.3 W0.2 F0.2<br>N10 G0 X60.<br>...<br>N20<br>G0 X100. Z100. M5<br>M01 |
| 52A02 | N2(S1_Outside_Groove_04_Straight)<br>T0602<br>G96 S180 M3<br>G0 X65. Z-15.<br>G1 X50. F0.08<br>G0 X65.<br>Z-13.<br>...<br>M01 |
| 52A03 | N3(S1_Inside_Thread_16_Straight)<br>T0403<br>G97 S1000 M3<br>G0 X30. Z5.<br>G92 X33.5 Z-20. F2.<br>X33.8<br>X34.1<br>...<br>G0 Z100. M5<br>M01 |
| 52A04 | N4 (S1_XC_Drill_05_Step)<br>T1104<br>M44<br>G97 S1600 M3<br>G98<br>G0 X40. Z5. C0.<br>G83 Z-10. Q3000 F200<br>...<br>M01 |
| 52A05 | N5 (S1_XC_Drill_05_Step)<br>T1005<br>G97 S1600 M3<br>G0 X100. Z0. C0.<br>Z-50.<br>X85.<br>G87 X65. Q3000 F200<br>...<br>M30 |

| 102A01 | N1 | 01 | 3101 | 16 | 03 | 1 |
|---|---|---|---|---|---|---|
| 102A02 | N2 | 06 | 5101 | 04 | 08 | 0 |
| 102A03 | N3 | 04 | 6201 | 16 | 06 | 1 |
| 102A04 | N4 | 11 | 1101 | 05 | 07 | 1 |
| 102A05 | N5 | 10 | 1101 | 05 | 08 | 0 |

FIG. 6B

| 101A01 | 01 | 3101 | 16 | 03 | 1 |
|---|---|---|---|---|---|
| 101A06 | 06 | 5101 | 04 | 08 | 0 |
| 101A04 | 04 | 6201 | 16 | 06 | 1 |
| 101A11 | 11 | 1101 | 05 | 07 | 1 |
| 101A10 | 10 | 1101 | 05 | 08 | 0 |

FIG. 6C

| 102A01 | N1 | 01 | 3101 | 16 | 03 | 1 |
|---|---|---|---|---|---|---|
| 101A01 |    | 01 | 3101 | 16 | 03 | 1 |
| 103A01 | N1 | 0  | 0    | 0  | 0  | 0 |
| 103A02 | N2 | 0  | 0    | 0  | 0  | 0 |
| 103A03 | N3 | 0  | 0    | 0  | 0  | 0 |
| 103A04 | N4 | 0  | 0    | 0  | 0  | 0 |
| 103A05 | N5 | 0  | 0    | 0  | 0  | 0 |

| 102A01 | N1 | 01 | 3101 | 16 | 03 | 1 |
| --- | --- | --- | --- | --- | --- | --- |
| 102A02 | N2 | 06 | 5101 | 04 | 08 | 0 |
| 102A03 | N3 | 04 | 6201 | 16 | 06 | 1 |
| 102A04 | N4 | 11 | 1101 | 05 | 07 | 1 |
| 102A05 | N5 | 10 | 1101 | 05 | 08 | 0 |

FIG. 7A

| 101A01 | 01 | 3101 | 16 | 03 | 1 |
| --- | --- | --- | --- | --- | --- |
| 101A06 | 06 | 5101 | 04 | 08 | 0 |
| 101A04 | 04 | 6201 | 09 | 06 | 0 |
| 101A11 | 11 | 1101 | 05 | 07 | 1 |
| 101A10 | 10 | 1101 | 05 | 08 | 0 |

FIG. 7B

| 102A03 | N3 | 04 | 6201 | 16 | 06 | 1 |
| --- | --- | --- | --- | --- | --- | --- |
| 101A04 |    | 04 | 6201 | 09 | 06 | 0 |
| 103A03 | N3 | 0  | 0    | 7  | 0  | 1 |

FIG. 7C

| | |
|---|---|
| 52A01 | N1<br>T0101<br>G96 S200 M3<br>G0 X100. Z5.<br>G71 U2. R0.5<br>G71 P10 Q20 U0.3 W0.2 F0.2<br>N10 G0 X60.<br>...<br>N20<br>G0 X100. Z100. M5<br>M01 |
| 52A02 | N2<br>T0602<br>G96 S180 M3<br>G0 X65. Z-15.<br>G1 X50. F0.08<br>G0 X65.<br>Z-13.<br>...<br>M01 |
| 52A03 | N3<br>T0403<br>G97 S1000 M3<br>G0 X30. Z5.<br>G92 X33.5 Z-20. F2.<br>X33.8<br>X34.1<br>...<br>G0 Z100. M5<br>M01 |
| 52A04 | N4<br>T1104<br>M44<br>G81 C0.<br>G97 S1600 M3<br>G98<br>G0 X40. Z5. C0.<br>G83 Z-10. Q3000 F200<br>...<br>M01 |
| 52A05 | N5<br>T1005<br>G97 S1600 M3<br>G0 X100. Z0. C0.<br>Z-50.<br>X85.<br>G87 X65. Q3000 F200<br>...<br>M30 |

| | Machining step number | Numbered tool holder | Type of cutting tool | Specification of cutting tool | Tip direction of cutting tool | Posture of cutting tool |
|---|---|---|---|---|---|---|
| 102A01 | N1 | 01 | 3999 | ** | 03 | 0 |
| 102A02 | N2 | 06 | 5101 | ** | 08 | 0 |
| 102A03 | N3 | 04 | 6201 | ** | 06 | 1 |
| 102A04 | N4 | 11 | 1101 | ** | 07 | 1 |
| 102A05 | N5 | 10 | 1101 | ** | 08 | 0 |

| | | | | | |
|---|---|---|---|---|---|
| 102A01 | N1 | 01 | 3101 | ** | 03 | 1 |
| 102A02 | N2 | 06 | 5101 | ** | 08 | 0 |
| 102A03 | N3 | 04 | 6201 | ** | 06 | 1 |
| 102A04 | N4 | 11 | 1101 | ** | 07 | 1 |
| 102A05 | N5 | 10 | 1101 | ** | 08 | 0 |

FIG. 10B

| | | | | | |
|---|---|---|---|---|---|
| 101A01 | 01 | 3101 | 16 | 03 | 1 |
| 101A06 | 06 | 5101 | 04 | 08 | 0 |
| 101A04 | 04 | 6201 | 16 | 06 | 1 |
| 101A11 | 11 | 1101 | 05 | 07 | 1 |
| 101A10 | 10 | 1101 | 05 | 08 | 0 |

FIG. 10C

| | | | | | | |
|---|---|---|---|---|---|---|
| 102A01 | N1 | 01 | 3101 | ** | 03 | 1 |
| 101A01 | | 01 | 3101 | 16 | 03 | 1 |
| 103A01 | N1 | 0 | 0 | ** | 0 | 0 |
| 103A02 | N2 | 0 | 0 | ** | 0 | 0 |
| 103A03 | N3 | 0 | 0 | ** | 0 | 0 |
| 103A04 | N4 | 0 | 0 | ** | 0 | 0 |
| 103A05 | N5 | 0 | 0 | ** | 0 | 0 |

| 102A01 | N1 | 01 | 3101 | ** | 03 | 1 |
| 102A02 | N2 | 06 | 5101 | ** | 08 | 0 |
| 102A03 | N3 | 04 | 6201 | ** | 06 | 1 |
| 102A04 | N4 | 11 | 1101 | ** | 07 | 1 |
| 102A05 | N5 | 10 | 1101 | ** | 08 | 0 |

FIG. 11A

| 101A01 | 01 | 3101 | 16 | 03 | 1 |
| 101A06 | 06 | 5101 | 04 | 08 | 0 |
| 101A04 | 04 | 6201 | 09 | 06 | 0 |
| 101A11 | 11 | 1101 | 05 | 07 | 1 |
| 101A10 | 10 | 1101 | 05 | 08 | 0 |

FIG. 11B

| 102A03 | N3 | 04 | 6201 | ** | 06 | 1 |
| 101A04 |    | 04 | 6201 | 09 | 06 | 0 |
| 103A03 | N3 | 0  | 0    | ** | 0  | 1 |

FIG. 11C

MATCHING RECOGNITION METHOD AND SYSTEM FOR NC PROGRAM AND CORRESPONDING CUTTING TOOLS OF MACHINE TOOLS

CROSS REFERENCE TO RELATED APPLICATION

This application claims the benefits of Taiwan application Serial No. 107135914, filed on Oct. 12, 2018, the disclosures of which are incorporated by references herein in its entirety.

TECHNICAL FIELD

The present disclosure relates in general to a machining technology, and more particularly to a matching recognition method and system for an NC program and corresponding cutting tools of machine tools.

BACKGROUND

Generally, CNC (Computer numerical control) machining is one of applications of automatic control. In this application, cutting tools are mounted onto the CNC machine in advance, a CNC controller would "read" a machine route, associated cutting paths, and corresponding machining parameters from an NC program, and then different cutting tools would be used to perform corresponding pre-configured machining process according to the NC program. While in practical machining upon a complicated workpiece, the arrangement of machining path and timing for loading correct cutting tools from a tool turret is particularly important.

By having turn-mill machining as an example, a complete machining process is consisted of different machining steps and corresponding cutting tools. For a machining to perform composite machining upon a complicated workpiece, a sequential step including an external turning tool and an associated NC program for outline machining can be used to perform related machining for forming an external profile, a sequential step including external grooving tools and an associated NC program for external grooving machining can be used to perform related machining for forming external circular grooves, a sequential machining step including an internal threading tool and an associated NC program for internal threading can be used to perform related machining for forming internal threads, and sequential machining step including a drilling tool and an associated NC program for axial hole drilling can be used to perform related machining for forming an internal axial hole. Hence, while encountering a workpiece with a complicated profile, a commercial CAD/CAM software package is usually used to edit the related NC program. The edited NC program includes all the sequential machining steps to complete necessary machining upon the workpiece. In addition, a pre-machining scheme sheet can be also optionally produced per requirement by the software. The pre-machining scheme sheet contains types, specifications and mounting postures of related cutting tools for individual sequential machining steps. A user can base on the pre-machining scheme sheet to select the cutting tools meeting the required types and specifications listed in the a pre-machining scheme sheet of cutting tools, and then the cutting tools are mounted onto the machine tools in accordance with the listed instructions. For example, in a turn-mill machine, the cutting tools are orderly mounted onto a rotational tool turret, in which the mounting direction can be unique, radial or axial. Then, the NC program is executed to perform the machining upon the workpiece.

Nevertheless, according to the pre-machining scheme sheet, an operator shall perform the mounting of the cutting tools defined with individual sequential machining steps onto the machine tools, and then the follow-up mounting inspections shall be carried out upon the types of cutting tools, mounting positions (at specific numbered tool holder for containing corresponding cutting tools defined in the pre-machining scheme sheet), mounting postures (axial, radial or in a specific angle) and tip directions of the cutting tools. In the art, the aforesaid mounting and inspections shall be performed by human, and thus human factors are inevitable. Possible human mistakes occur in wrong selections of types and specifications of cutting tools, mounting the cutting tool into a wrong numbered tool holder, and other mounting errors such as irrelevant postures and/or pointing errors of the cutting tools. If any aforesaid mistake occurs prior to a machining process, then, during a normal machining process, the cutting tools and the NC programs might be mismatched (for example, perform a turning process by a drilling tool, perform an axial drilling process by a radial-mounted drilling tool, or the like mismatching between the machining process and the cutting tools), most of or entire production would be failed, r even an unexpected impact between the cutting tool and the machine tools or the workpiece leads to a potential loss in life, money and resources. Thereupon, cost for the production is substantially increased.

Accordingly, it is necessary and urgent to the skill in the art to provide a matching recognition method and system for an NC program and corresponding cutting tools that can, prior to a practical machining, help the user to perform matching recognition between the NC program of individual sequential machining steps and the corresponding cutter tools on the machine tools. The system and method provided by this disclosure can minimize the human factors to some degree, such that the machining process upon workpieces can be performed precisely. Thereupon, higher quality and better safety in product machining can be achieved.

SUMMARY

In one embodiment of this disclosure, a matching recognition method for an NC program and corresponding cutting tools includes: a step of using an imaging device to capture 2-dimensional images from the cutting tools mounted at the corresponding numbered tool holders on machine tools; a step of based on the 2-dimensional images to extract outline feature points and assembling postures of cutting tools and converting into corresponding tool-assembling strings; a step of obtaining tool demands from each of the sequential machining steps in the NC program, and converting into corresponding stepwise tool-demanding strings; and, a step of performing matching upon the tool-assembling strings and the stepwise tool-demanding strings to generate and output corresponding step-and-tool matching strings.

In another embodiment of this disclosure, a matching recognition system for an NC program and corresponding cutting tools includes: an imaging device for capturing 2-dimensional images from the cutting tools mounted at the corresponding numbered tool holders on machine tools; an image-processing module based on the 2-dimensional images to extract outline feature points and assembling postures of cutting tools and converting into corresponding tool-assembling strings; a step-decoding module for obtaining tool demands from each of the sequential machining steps in the NC program and converting into corresponding stepwise tool-demanding strings; and, a matching and comparing module for performing matching upon the tool-assembling strings and the stepwise tool-demanding strings to generate and output corresponding step-and-tool matching strings.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 3A is a schematic view of 2-dimensional tool images;

FIG. 3B is a schematic view of outline feature points and assembling postures of cutting tools;

FIG. 3C demonstrates plural tool-assembling strings;

FIG. 4A demonstrates schematically an image of a cutting tool captured by an imaging device;

FIG. 4B is a schematic view of FIG. 4A;

FIG. 4C is a schematic view showing exact dimensions of the cutting tool derived by the image-processing module;

FIG. 4D is a schematic view showing different tip directions of the cutting tool;

FIG. 5A demonstrates schematically program codes of sequential machining steps of an NC program of FIG. 2;

FIG. 5B shows stepwise tool-demanding strings extracted from FIG. 5A;

FIG. 6A shows stepwise tool-demanding string in accordance with this disclosure;

FIG. 6B lists searched tool-assembling string according to FIG. 6A;

FIG. 6C shows step-and-tool matching strings from correct matching between strings of FIG. 6A and FIG. 6B;

FIG. 7A shows another stepwise tool-demanding strings in accordance with this disclosure;

FIG. 7B lists searched tool-assembling strings according to FIG. 7A;

FIG. 7C shows step-and-tool matching strings from incorrect matching between strings of FIG. 7A and FIG. 7B;

FIG. 9A demonstrates schematically program codes of sequential machining steps of an NC program of FIG. 8;

FIG. 9B shows stepwise tool-demanding strings extracted from FIG. 9A;

FIG. 10A shows stepwise tool-demanding strings in accordance with this disclosure;

FIG. 10B lists searched tool-assembling strings according to FIG. 10A;

FIG. 10C shows step-and-tool matching strings from correct matching between strings of FIG. 10A and FIG. 10B;

FIG. 11A shows another stepwise tool-demanding strings in accordance with this disclosure;

FIG. 11B lists searched tool-assembling strings according to FIG. 11A; and

FIG. 11C shows step-and-tool matching strings from incorrect matching between strings of FIG. 11A and FIG. 11B.

DETAILED DESCRIPTION

Figure 1:
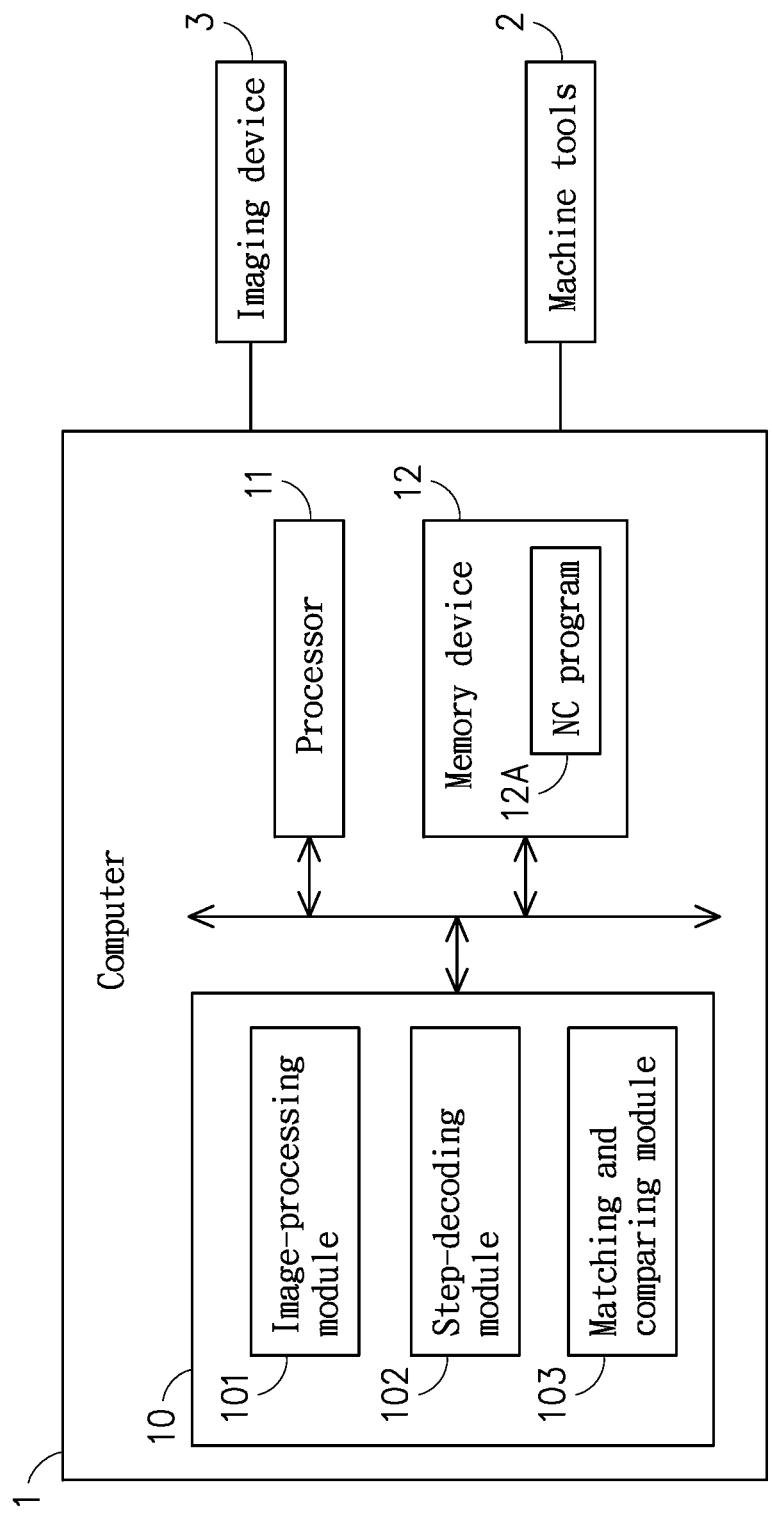
FIG. 1 is a schematic view of a framework of an embodiment of the matching recognition system for an NC program and corresponding cutting tools in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to FIG. 1, the matching recognition system 10 for an NC program and corresponding cutting tools mounted on a machine tool 2 (as the matching recognition system thereafter) is applicable to a computer 1 connecting the machine tool 2 having the cutting tools. Preferably, the matching recognition system 10 can include an imaging device 3, an image-processing module 101, a step-decoding module 102, and a matching and comparing module 103. In this disclosure, the computer 1 can be a controller, and the machine tool 2 is connected with the controller 1.

The imaging device 3 connected with the computer 1 is used for capturing 2-dimensional images of corresponding cutting tools mounted at respective numbered tool holders on the machine tools 2, where the numbered tool holder can be a tool sleeve assigned with a specific number.

The image-processing module 101 installed inside the computer 1 is used for obtaining the 2-dimensional images of the corresponding cutting tools mounted at the respective numbered tool holders on the machine tools 2 from the imaging device 3, extracting outline feature points and assembling postures of the individual cutting tools according to the obtained 2-dimensional images, and converting extracted results into a string data (as a tool-assembling string thereafter), where the extracted results include types, specifications, tip directions and postures of the cutting tools.

The step-decoding module 102 installed inside the computer 1 is used for reading an NC program 12A to be executed, analyzing the NC program 12A to obtain tool demands in correspondence with individual sequential machining steps of the NC program 12A, and converting the tool demands into a string data (as a stepwise tool-demanding string thereafter), where the tool demands include types, specifications, tip directions and postures of the cutting tools.

The matching and comparing module 103 installed inside the computer 1 is used for introducing a mathematical method to perform matching between the tool-assembling string and the stepwise tool-demanding string, obtaining differences between these two strings, outputting the differences in a string form (as a step-and-tool matching string thereafter), and displaying the step-and-tool matching string on the computer 1.

Preferably, the computer 1 connected both the machine tool 2 and the imaging device 3 can be a server, a mainframe or any the like. The computer 1 includes a processor 11 and a memory device 12. The processor 11 is used for executing the matching recognition system 10 for the NC program 12A and the corresponding cutting tools and all other built-in software such as an operation system. The memory device 12 can be a hard disk, a memory card or any storage means the like. The memory device 12 is used for storing versatile data such as videos, voices, images, strings, the NC program 12A, and information received by the matching recognition system 10.

The machine tools 2 can be any machine equipped with the cutting tools such as a milling machine and a turn-mill machine. The imaging device 3 can be an independent device connected with the computer 1, or a CCD (Charge-coupled device) image sensor mounted on the machine tool. The imaging device 3 can be used for capturing images of the cutting tools at the respective numbered tool holders on the machine tools 2, and transmitting the captured images to the computer 1 for further processing.

Figure 2:
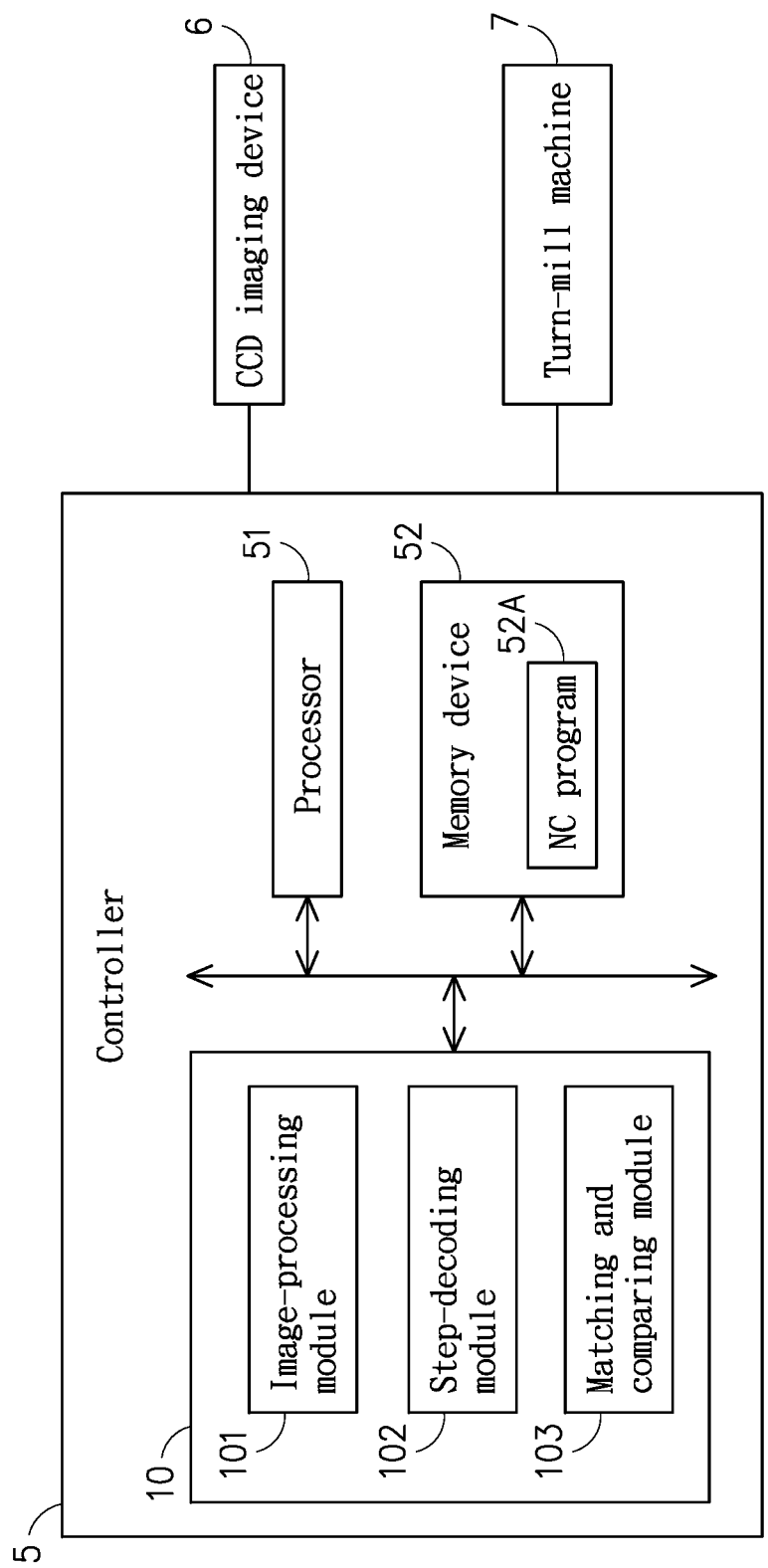
FIG. 2 demonstrates schematically an application of FIG. 1 in a turn-mill machine.

Referring now to FIG. 2, an application of the matching recognition system 10 for the NC program 12A and the corresponding cutting tools 10 on a turn-mill machine 7 is schematically shown. Through this embodiment, the process for analyzing the sequential machining steps can be well elucidated.

In FIG. 2, the matching recognition system 10 is applied to the controller 5 (equivalent to the computer 1 of FIG. 1) of the turn-mill machine 7. The controller 5 is connected with the turn-mill machine 7 (equivalent to the machine tools 2 of FIG. 1) and the CCD imaging device 6 (equivalent to the imaging device 3 of FIG. 1). In this embodiment, the turn-mill machine 7 can have 12 numbered tool holders, for example. Namely, the turn-mill machine 7 has a rotational tool turret with 12 tool holders for mounting 12 cutting tools to be used for different sequential machining steps. The CCD imaging device 6 can be an independent device connected with the controller 5.

Referring now to FIG. 2 and FIG. 3A, the CCD imaging device 6 is applied to capture 2-dimensional tool images 60 of individual cutting tools mounted at the 12 numbered tool holders on the turn-mill machine 7, and further to transmit these 12 2-dimensional tool images 6001-6012 to the controller 5 for further processing. As noted in FIG. 3A, holders 6005 and 6009 are empty. Namely, no cutting tool is located in each of these two numbered tool holders.

Referring now to FIG. 2, and FIG. 3A through FIG. 3C, the image-processing module 101 installed in the controller 5 can then obtain the 12 2-dimensional tool images 6001-6012 from the CCD imaging device 6 (as shown in FIG. 3A), analyze each of the 12 2-dimensional tool images 6001-6012 to obtain corresponding outline feature points and tool assembling postures 6001A-6012A of the cutting tools (as shown in FIG. 3B), convert the analyzed results of the 12 outline feature points and tool assembling postures 6001A-6012A of the cutting tools into 12 strings (as 12 tool-assembling strings 101A01-101A12, shown in FIG. 3C), and transmit these 12 tool-assembling strings to the controller 5 for further processing. The analyzed results can include the numbered tool holders, the types, the specifications, the tip directions and the postures of the respective cutting tools. In this disclosure, the 2-dimensional images experience a binarization treatment to obtain the analyzed results.

Refer now to FIG. 3C, and FIG. 4A through FIG. 4D. By having the tool-assembling string 101A01 corresponding to the 01 numbered tool holder as an example, the image of the corresponding cutting tool at the 01 numbered tool holder (as shown in FIG. 4A), captured by the CCD imaging device 6, is processed by the image-processing module 101 for a pre-imaging treatment, for example, to filter out high-frequency noise that might be miss-judged as an edge of the image, an edge or contour detection to transform the image into a black-white boundary image, and further a (Hough transform to perform feature extraction and image analysis. The image-processing module 101 then adopts some filtration criteria to obtain lines or patterns (for example, lengths of lines, sizes of circles, proportionality of triangles and squares) of the target image (as shown in FIG. 4B). Finally, the system 10 would derive the actual dimensions of individual cutting tools (as shown in FIG. 4C) by evaluating the imaging device, the lens module, the working distance, the resolutions (for example, μm/pixel), and counts of pixels upon the featured contour of the image. Following are information that can be obtained by the image-processing module 101 upon the image of FIG. 4B. The digit 01 would be assigned to the numbered tool holder for the image captured from the first numbered tool holder. From the contour of the image, the cutting tool thereof is a turning tool with a 35° tip angle. According to the preset coding of the cutting tools built inside the image-processing module 101, this cutting tool would be assigned to be 3101. As shown in FIG. 4C, a length of cutting edge of the cutting tool is 16 mm, and thus the specification of the cutting tool would be assigned to be 16. According to the ISO spec for tip direction of cutting tools, the tip direction shown in FIG. 4D can be classified as 03. Finally, the assembling posture of the cutting tool with respect to the workpiece on a turn-mill machine can be defined as a radial assembly, and thus the posture of the cutting tool can be classified as 0, according to the classification of assembling postures of cutting tools. Referring now to FIG. 3C, and FIG. 4A through FIG. 4D, the tool-assembling string 101A05 corresponding to the fifth numbered tool holder is taken as another example. Since no cutting tool is mounted at this numbered tool holder, thus no 2-dimensional image can be captured.

Referring now to FIG. 3C, the string led by 101A01 is taken as an example for an explanation purpose. The image-processing module 101 integrated all the foregoing codes. The first section code is 01 standing for the tool holder number 01, the second section code is 3101 standing for a V-shape external turning tool, the third section code is 16 standing for a 16-mm in length of cutting edge, the fourth section code is 03 standing for a lower-left tip direction defined by ISO, and the fifth section code is 0 standing for a radial posture to the cutting tool with respect to the workpiece loaded on a turn-mill machine. Referring now to FIG. 3C, the string led by 101A05 is taken as another example. Since no cutting tool is mounted at this numbered tool holder, thus, except for the leading code 101A05 and the first section code 05, all other section codes would be 0.

Referring now to FIG. 2, FIG. 5A and FIG. 5B, the step-decoding module 102 utilizes the controller 5 to read the NC program 52A from the memory device 52, then analyzes all the tool demands within individual sequential machining steps 52A01-52A05 in the NC program 52A, and converts the tool demands into a corresponding string (called as a stepwise tool-demanding string 102A shown in FIG. 5B); in which the tool demands include the numbered tool holder, the type, the specification, the tip direction and the posture of the corresponding cutting tool. The analytic method for obtaining the stepwise tool-demanding string 102A in correspondence with individual sequential machining steps 52A01-52A05 in the NC program 52A is to read the NC program 52A and extract all the annotations and cutting tool codes within individual sequential machining steps, and further to convert these annotations and cutting tool codes into the stepwise tool-demanding string 102A of the sequential machining steps.

Referring now to FIG. 5A and FIG. 5B, the NC program 52A is a program code having five sequential machining steps 52A01-52A05. For example, in the first sequential machining step 52A01, the annotation is S1_Outside Transverse_V insert_16. The S1 implies that the machining is performed on the XZ plane along the first spindle of the turn-mill machine, and thus the posture of the corresponding cutting tool would be radially mounted. The Outside stands for an outside contour turning, and thus the cutting tool would be an external turning tool. The Transverse stands for a horizontal reciprocal turning cycle, and thus the tip direction of the cutting tool is directed to a lower left direction. The V insert stands for a cutting tool with a V-shape cutting edge, and thus the cutting tool is a profile cutter with a V-shape cutting edge. The 16 stands for a 16-mm in length of cutting edge, and thus the specification of the corresponding cutting tool is a diameter in external turning tool with a 16-mm in cutting edge. In analyzing the cutting tool codes within the sequential machining steps, the cutting tool code T0101 implies that the machining is performed by using the cutting tool at the tool holder number 01 and adopting the first cutting-tool compensation value.

In analyzing the code of the sequential machining step, the N1 code for the sequential machining step implies that this sequential machining step is the first sequential machining step. The analyzed results of the first sequential machining step 52A01 is further converted into the first stepwise tool-demanding string 102A01 (as shown in FIG. 5B). In the first stepwise tool-demanding string 102A01, the first section code N1 implies that this instant sequential machining step is the first sequential machining step, the second section code 01 implies that the cutting tool for this instant sequential machining step is the cutting tool mounted at the 01 numbered tool holder, the third section code 3101 implies that the cutting tool for the instant sequential machining step adopts an external turning tool having a V-shape cutting edge, the fourth section code 16 implies that the instant sequential machining step adopts an external turning tool having a 16-mm long cutting edge, the fifth section code 03 implies that the tip direction of the cutting tool for the instant sequential machining step is directed to a lower left direction, and the sixth section code 0 implies that the posture of the cutting tool for instant sequential machining step is radially arranged.

Referring now again to FIG. 5A and FIG. 5B, in the third sequential machining step 52A03, the annotation is S1_Inside_Thread_16_straight. The S1 implies that the machining is performed on the XZ plane along the first spindle of the turn-mill machine, and thus the posture of the corresponding cutting tool would be radially mounted. The Inside stands for an inner contour turning, and thus the cutting tool would be axially mounted. The Thread stands for a reciprocal threading cycle, and thus the tip direction of the cutting tool is directed to an upward direction. The Straight stands for a cutting tool with a 60° tooth-shape cutting edge, and thus the cutting tool is an inner threading tool with a 60° tooth-shape cutting edge. The 16 stands for a 16-mm in length of inscribed cutting edge, and thus the specification of the corresponding cutting tool is a threading tool with a 16-mm long inscribed cutting edge. In analyzing the cutting tool codes within the sequential machining steps, the cutting tool code T0403 implies that the machining is performed by using the cutting tool at the tool holder number 04 and adopting the third cutting-tool compensation value.

In analyzing the code of the sequential machining step, the N3 code for the sequential machining step implies that this sequential machining step is the third sequential machining step. The analyzed results of the third sequential machining step 52A03 is further converted into the third stepwise tool-demanding string 102A03. In the third stepwise tool-demanding string 102A03, the first section code N3 implies that this instant sequential machining step is the third sequential machining step, the second section code 04 implies that the cutting tool for this instant sequential machining step is the cutting tool mounted at the tool holder number 04, the third section code 6201 implies that the cutting tool for the instant sequential machining step adopts an internal threading tool with a 60° tooth-shape cutting edge, the fourth section code 16 implies that the instant sequential machining step adopts an internal threading tool having a 16-mm long inscribed cutting edge, the fifth section code 06 implies that the tip direction of the cutting tool for the instant sequential machining step is directed upward, and the sixth section code 1 implies that the posture of the cutting tool for instant sequential machining step is axially arranged.

Referring now to FIG. 2, FIG. 5A and FIG. 5B, similar to the processing method performed by the step-decoding module 102, all the five sequential machining steps 52A01-52A05 in the NC program 52A can be analyzed orderly, and the corresponding stepwise tool-demanding strings 102A01-102A05 are then transmitted to the controller 5 for further processing.

Referring now to FIG. 2, and FIG. 6A~FIG. 6C, via internal data transmission of the controller 5, the matching and comparing module 103 reads the tool-assembling strings 101A01-101A12 (as shown in FIG. 3C) and the stepwise tool-demanding strings 102A01-102A05 (as shown in FIG. 5B), introduces a mathematical method to perform matching between the tool-assembling strings 101A01-101A12*d* the stepwise tool-demanding strings 102A01-102A05, obtains differences between these two strings, outputs the differences in a string form (as step-and-tool matching strings 103A01-103A05 thereafter), and displays the step-and-tool matching string on the computer 1 as well as the controller 5.

The matching method is to read the first stepwise tool-demanding string 102A01, then, by having the second section code 01 (tool holder number) of the first stepwise tool-demanding string 102A01 as a search clue, to search whether or not any first section code (tool holder number) within all the tool-assembling strings 101A01-101A12 meets the search clue. If positive, then matching is real. In this embodiment, the tool-assembling string 101A01 (standing for the tool-assembling string of the first numbered tool holder) fulfills the matching. Then, a mathematical method is applied to calculate the differences for the section codes standing for the same meaning between the first stepwise tool-demanding string 102A01 and the tool-assembling string 101A01 of the first numbered tool holder. The calculated results (the differences) are integrated and called as a step-and-tool matching string 103A01 displayed on the controller 5.

Similarly, the same matching process can be applied to all the sequential machining steps 52A01-52A05 in the NC program 52A shown in FIG. 5A. If all the step-and-tool matching strings 103A01-103A05 have the same result 0 (as shown in FIG. 6C), then it implies that all the cutting tools on the machine tool match the needs of the NC program 52A, and thus the corresponding machining can be performed correctly.

Referring now to FIG. 7A through FIG. 7C, if any string difference of a sequential machining step is not 0, then it implies that the NC program 52A of FIG. 5A can't execute safely the corresponding machining. For example, after performing the matching calculation upon stepwise tool-demanding string 102A03 of the third sequential machining step 52A03 in the NC program 52A, it is found that the fourth section code and the sixth section code of the step-and-tool matching string 103A03 are not 0 (7 for a wrong specification, and 1 for a irrelevant assembling posture of the cutting tool), then machining safety would be a problem because the cutting tools on the turn-mill machine can't matches the third sequential machining step 52A03 in the NC program 52A.

Figure 8:
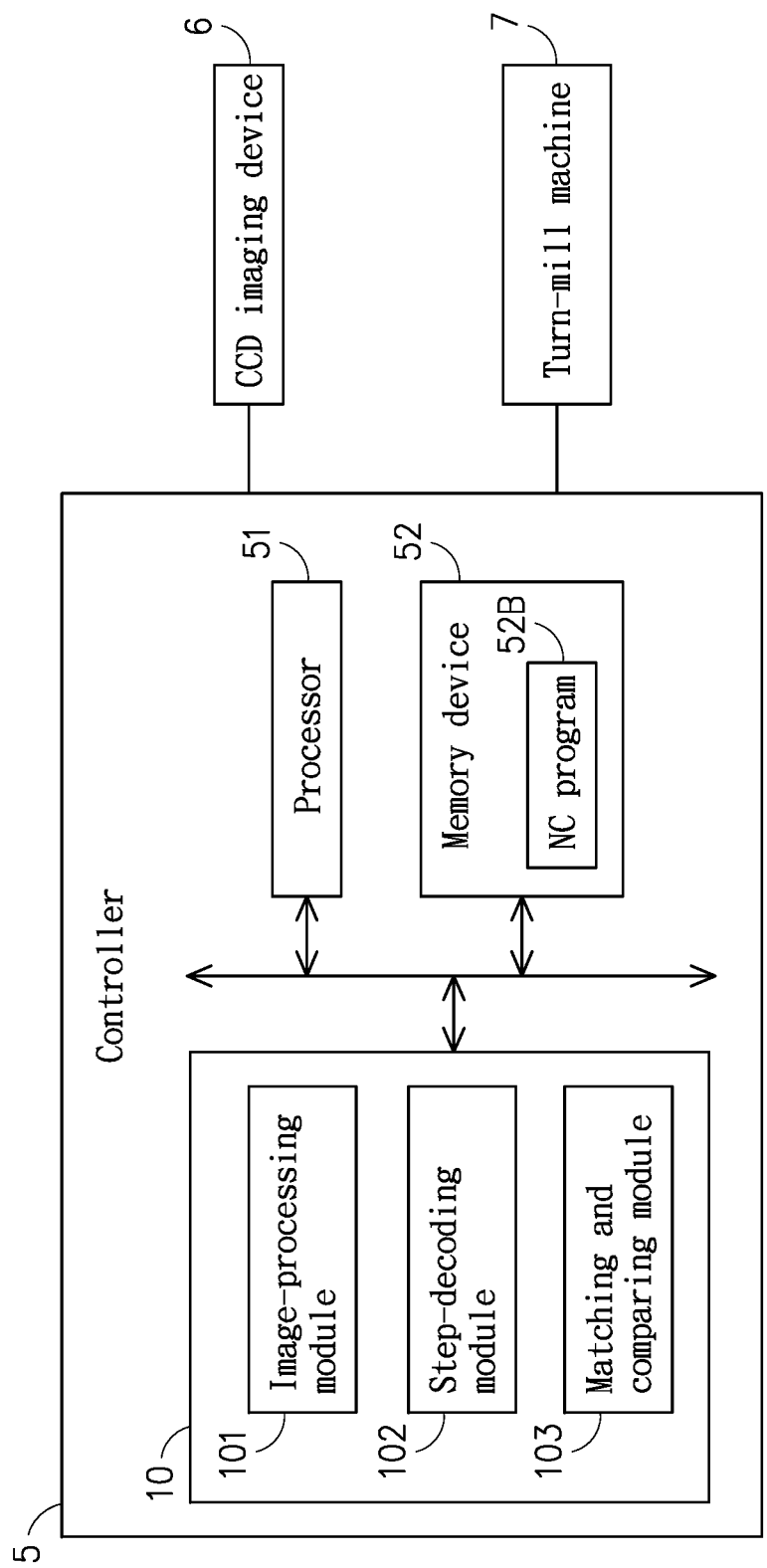
FIG. 8 demonstrates schematically another application of FIG. 2 in a turn-mill machine.

Referring now to FIG. 8, the matching recognition system 10 for an NC program and corresponding cutting tools is applied to the turn-mill machine. By using this embodiment, G codes and moving routes would be analyzed and elucidated thereupon.

The framework of this embodiment is basically the same as that of FIG. 2. In this embodiment, the matching recognition system 10 for an NC program and corresponding cutting tools is applied to a controller 5 of a turn-mill machine 7. The controller 5 is connected with the turn-mill machine 7 and a CCD imaging device 6. The turn-mill machine 7 can have 12 numbered tool holders. The CCD imaging device 6 is used for capturing 2-dimensional images 60 of 12 cutting tools mounted individually at the 12 numbered tool holders, and the 12 2-dimensional tool images 6001-6012 are transmitted to the controller 5 for further processing.

Details about the 2-dimensional tool images, the outline feature points and the assembling postures of cutting tools, and the tool-assembling strings, please refer to FIG. 3A through FIG. 3C and related descriptions. The tool-assembling strings 101A01-101A12 shown in FIG. 3C are then transmitted to the controller 5 of FIG. 8 for further processing.

Referring now to FIG. 8, FIG. 9A and FIG. 9B, a major difference between this embodiment and that of FIG. 2 is that the NC program 52B of this embodiment is different to the NC program 52A of FIG. 2. Via data transmission inside the controller 5, the step-decoding module 102 is used for reading the NC program 52B stored in the memory device 52, and analyzing each individual sequential machining step in the NC program 52B so as to obtain corresponding tool demands, and converting the tool demands into a string called as a stepwise tool-demanding string 102B, in which the tool demands include the numbered tool holders, the types of the cutting tool, the tip direction and postures of the cutting tools. The method for analyzing individual sequential machining steps in the NC program 52B to obtain the stepwise tool-demanding strings 102B corresponding to the individual sequential machining steps is to read the NC program 52B, further to analyze the cutting tool code, the G code and the cutting tool route of each the sequential machining step, and to convert the analyzed results into a stepwise tool-demanding string 102B for each the sequential machining step. In this embodiment, the NC program 52B is consisted of five sequential machining steps.

For example, refer to the first sequential machining step 52B01 of FIG. 9A. The G71 is the G code for a horizontal reciprocal turning cycle. The U0.3 directed to a forward machining with set-aside amount is a horizontal reciprocal outside turning cycle, the tip direction of the corresponding cutting tool is a lower left direction, and the assembling posture of the cutting tool is radially mounted. In analyzing the cutting tool codes within the sequential machining steps, the cutting tool code TO101 implies that the machining is performed by using the cutting tool at the tool holder number 01 and adopting the first cutting-tool compensation value. In analyzing the sequential machining steps, the sequential machining step N1 implies that the instant sequential machining step is the first sequential machining step. The analyzed results of the first sequential machining step 52B01 is converted into the corresponding first stepwise tool-demanding string 102A01.

Refer now to FIG. 9B. In the first stepwise tool-demanding string 102A01, the first section code N1 implies that this instant sequential machining step is the first sequential machining step, the second section code 01 implies that the cutting tool for this instant sequential machining step is the cutting tool mounted at the 01 numbered tool holder, the third section code 3999 implies that the cutting tool for the instant sequential machining step adopts an external turning cutter, the fourth section code  implies that the step-decoding module 102** does not analyze the specification of the cutting tool needed in this instant sequential machining step, the fifth section code 03 implies that the tip direction of the cutting tool for the instant sequential machining step is directed to a lower left direction, and the sixth section code 0 implies that the posture of the cutting tool for instant sequential machining step is radially arranged.

Refer now to FIG. 9A. In the fifth sequential machining step 52B05, the G87 implies that the G code for the radial drilling process and the X-axial values are decreasing. For the radial drilling process, the cutting tool is a drilling tool having a downward tip direction and a radial assembling posture. In analyzing the cutting tool code within the sequential machining step, the cutting tool code T1005 implies that the drilling process is performed by using the cutting tool at the tool holder number 10 and adopting the fifth cutting-tool compensation value. In analyzing the sequential machining step number, the sequential machining step number N5 implies that this instant sequential machining step is the fifth sequential machining step. The analyzed results of the fifth sequential machining step 52B05 is converted into the corresponding fifth stepwise tool-demanding string 102A05 of FIG. 9B.

Refer now to FIG. 9B. In the fifth stepwise tool-demanding string 102A05, the first section code N5 implies that this instant sequential machining step is the fifth sequential machining step, the second section code 10 implies that the cutting tool for this instant sequential machining step is the cutting tool mounted at the 10 numbered tool holder, the third section code 1101 implies that the cutting tool for the instant sequential machining step adopts a drilling tool, the fourth section code implies that the step-decoding module 102 does not analyze the specification of the cutting tool needed in this instant sequential machining step, the fifth section code 08 implies that the tip direction of the cutting tool for the instant sequential machining step is directed downward, and the sixth section code 0 implies that the posture of the cutting tool for instant sequential machining step is radially arranged.

Refer now to FIG. 9A. In the third sequential machining step 52B03, the G92 implies that the G code for the internal reciprocal threading cycle and the X-axial values are increasing. For an internal reciprocal threading process, the cutting tool is an internal thread cutting tool having an upward tip direction and an axial assembling posture. In analyzing the cutting tool code within the sequential machining step, the cutting tool code T0403 implies that the threading is performed by using the cutting tool at the tool holder number 4 and adopting the third cutting-tool compensation value. In analyzing the sequential machining step number, the sequential machining step number N3 implies that this instant sequential machining step is the third sequential machining step. The analyzed results of the third sequential machining step 52B03 is converted into the corresponding third stepwise tool-demanding string 102A03 of FIG. 9B.

Refer now to FIG. 9B. In the third stepwise tool-demanding string 102A03, the first section code N3 implies that this instant sequential machining step is the third sequential machining step, the second section code 04 implies that the cutting tool for this instant sequential machining step is the cutting tool mounted at the 04 numbered tool holder, the third section code 6201 implies that the cutting tool for the instant sequential machining step adopts an internal threading tool, the fourth section code ** implies that the step-decoding module 102 does not analyze the specification of the cutting tool needed in this instant sequential machining step, the fifth section code 06 implies that the tip direction of the cutting tool for the instant sequential machining step is directed upward, and the sixth section code 1 implies that the posture of the cutting tool for instant sequential machining step is axially arranged.

Referring now to FIG. 9A and FIG. 9B, similar to the processing method performed by the step-decoding module 102, all the five sequential machining steps 52B01-52B05 in the NC program 52B can be analyzed orderly, and the corresponding stepwise tool-demanding strings 102A01-102A05 are then transmitted to the controller 5 for further processing.

Referring now to FIG. 8, and FIG. 10A~FIG. 10C, via internal data transmission of the controller 5, the matching and comparing module 103 reads the tool-assembling strings 101A01-101A12 and the stepwise tool-demanding strings 102A01-102A05, introduces a mathematical method to perform matching between the tool-assembling strings 6001B-6012B and the stepwise tool-demanding strings 102A01-102A05 so as to obtain differences between these two strings, and displays the results on the controller 5.

Referring now to FIG. 10A through FIG. 10C, the matching method is to read the first stepwise tool-demanding string 102A01, then, by having the second section code 01 (tool holder number) of the first stepwise tool-demanding string 102A01 as a search clue, to search whether or not any first section code (tool holder number) within all the tool-assembling strings 101A01-101A12 meets the search clue. If positive, then matching is real. In this embodiment, the tool-assembling string 101A01 (standing for the tool-assembling string of the first numbered tool holder) fulfills the matching. Then, a mathematical method is applied to calculate the differences for the section codes standing for the same meaning between the first stepwise tool-demanding string 102A01 and the tool-assembling string 101A01 of the first numbered tool holder. The calculated results (the differences) are integrated and called as a step-and-tool matching string 103A01 displayed on the controller 5 of FIG. 8.

In this embodiment, since the step-decoding module 102 does not analyze specifications of the cutting tools required in the sequential machining steps, thus, while the matching and comparing module 103 is active, and thus no difference calculation would be performed upon the specifications of the cutting tools.

Referring now to FIG. 10C, the same matching process can be applied to all the sequential machining steps 52B01-52B05 in the NC program 52B shown in FIG. 9A. If all the step-and-tool matching strings 103A01-103A05 have the same result 0, then it implies that all the cutting tools on the machine tools match the needs of the NC program 52B, and thus the corresponding machining can be performed correctly. As shown in FIG. 10C, the step-and-tool matching strings 103A01-103A05 include only 0.

Referring now to FIG. 11A through FIG. 11C, if any string difference of a sequential machining step is not 0, then it implies that the NC program 52B of FIG. 9A can't execute safely the corresponding machining. For example, after performing the matching calculation upon stepwise tool-demanding string 103A03 of the third sequential machining step 52B03 in the NC program 52B, it is found that the sixth section code of the step-and-tool matching string 103A03 are not 0 (1 for a irrelevant assembling posture of the cutting tool), then machining safety would be a problem because the cutting tools on the turn-mill machine can't matches the third sequential machining step 52B03 in the NC program 52B.

In all the aforesaid embodiments of this disclosure, each of the strings is consisted of only digits, and the calculated differences are used for performing the matching in a mathematical manner. However, in some other embodiments, match determination based on a logic comparison (in symbols or characters) can also prevail in accordance with this disclosure.

Based on the matching recognition system for an NC program and corresponding cutting tools 10 described above, a matching recognition method for an NC program and corresponding cutting tools includes the steps of:

(A) using an image-processing module 101 to read 2-dimensional images of cutting tools at corresponding numbered tool holders on a machine tool, wherein the 2-dimensional images are captured by an imaging device 3;

(B) based on the 2-dimensional images captured by the imaging device 3, analyzing the 2-dimensional images to obtain outline feature points and assembling postures of the cutting tools (called as analyzed results thereafter), and converting the analyzed results into a tool-assembling string, wherein the analyzed results include the numbered tool holders, types, specifications, tip directions and postures of the cutting tools;

(C) applying a step-decoding module 102 to read an NC program in a memory device 12, analyzing each of sequential machining steps in the NC program to obtain corresponding tool demands, and integrating the tool demands into a stepwise tool-demanding string, wherein the tool demands includes the numbered tool holders, the types, the specifications, the tip directions and the postures of the cutting tools; and (D) utilizing a matching and comparing module 103 to read the tool-assembling string and the stepwise tool-demanding string, using a mathematical method to match the tool-assembling string and the stepwise tool-demanding string and to further obtain a difference in between thereof, outputting the difference as a step-and-tool matching string, and displaying the step-and-tool matching string on the computer 1.

In summary, the matching recognition system and method for an NC program and corresponding cutting tools provided by this disclosure can, prior to a practical machining, help the user to perform matching recognition between the NC program of individual sequential machining steps and the corresponding cutter tool is on the machine tools. The system and method provided by this disclosure can minimize the human factors to some degree, such that the machining process upon workpieces can be performed precisely. Thereupon, higher quality and better safety in product machining can be achieved.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A matching recognition method for an NC program and corresponding cutting tools, applied to a computer furnished with the NC program, the NC program including a plurality of sequential machining steps, the computer connecting a machine tool and an imaging device, the machine tool including a plurality of numbered tool holders, each of the plurality of numbered tool holders mounting one of the cutting tools, comprising the steps of:
    using the imaging device to capture a plurality of 2-dimensional images from the cutting tools;
    based on the plurality of 2-dimensional images, extracting outline feature points and assembling postures of the cutting tools to form a plurality of analyzed results, converting the plurality of analyzed results into a plurality of corresponding tool-assembling strings having a plurality of section codes, wherein the plurality of analyzed results include types, specifications, tip directions and postures of the cutting tools;
    obtaining a plurality of tool demands from the plurality of sequential machining steps, converting the plurality of tool demands into a plurality of corresponding stepwise tool-demanding strings having a plurality of section codes, wherein the plurality of tool demands include numbered tool holder, types, specifications, tip directions and postures of the cutting tools, and each of the plurality of section codes of the tool-assembling strings corresponds to one of the section codes of the stepwise tool-demanding strings; and
    performing matching upon the plurality of tool-assembling strings and the plurality of stepwise tool-demanding strings to obtain and then output a plurality of corresponding step-and-tool matching strings by:
        for each respective stepwise tool-demanding string of the plurality of stepwise tool-demanding strings, retrieving, from the plurality of section codes of the respective stepwise tool-demanding string, a tool holder section code representing a tool holder number of one of the plurality of numbered tool holders;
        determining, among the plurality of tool-assembling strings, whether any of the plurality of tool-assembling strings has a corresponding tool holder section code representing the same tool holder number;
        in response to determining that a respective tool-assembling string of the plurality of tool-assembling strings has the corresponding tool holder section code representing the same tool holder number, calculating differences between the other section codes of the respective tool-assembling string and the corresponding section codes of the respective stepwise tool-demanding string, and integrating the differences to obtain a respective step-and-tool matching string of the plurality of step-and-tool matching strings; and
        outputting the plurality of step-and-tool matching strings.

2. The matching recognition method for an NC program and corresponding cutting tools of claim 1, wherein the plurality of tool-assembling strings and the plurality of stepwise tool-demanding strings are digits.

3. The matching recognition method for an NC program and corresponding cutting tools of claim 2, wherein a mathematical method is applied to calculate the differences between the plurality of tool-assembling strings and the plurality of stepwise tool-demanding strings for obtaining the plurality of step-and-tool matching strings.

4. The matching recognition method for an NC program and corresponding cutting tools of claim 1, wherein the plurality of 2-dimensional images experience a binarization treatment to obtain the plurality of analyzed results.

5. The matching recognition method for an NC program and corresponding cutting tools of claim 1, wherein the computer is a controller.

6. The matching recognition method for an NC program and corresponding cutting tools of claim 1, wherein:
    when all of the differences of the plurality of step-and-tool matching strings are 0, all of the cutting tools on the machine tool match needs of the NC program; and
    when at least one of the differences of the plurality of step-and-tool matching strings is not 0, at least one of the cutting tools on the machine tool does not match the needs of the NC program.

7. The matching recognition method for an NC program and corresponding cutting tools of claim 1, wherein a specific section code of the plurality of section codes of the plurality of stepwise tool-demanding strings includes a designated symbol to indicate that the specific section code is not analyzed.

8. A matching recognition system for an NC program and corresponding cutting tools, applied to a computer furnished with the NC program, the NC program including a plurality of sequential machining steps, the computer connecting a machine tool and an imaging device, the machine tool including a plurality of numbered tool holders, each of the plurality of numbered tool holders mounting one of the cutting tools, comprising:
    an imaging device, connected with the computer, being to capture a plurality of 2-dimensional images from the cutting tools;
    an image-processing module, installed in the computer, being to base on the plurality of 2-dimensional images to extract outline feature points and assembling postures of the cutting tools to obtain a plurality of analyzed results, converting the plurality of analyzed results into a plurality of corresponding tool-assembling strings having a plurality of section codes, wherein the plurality of analyzed results include types, specifications, tip directions and postures of the cutting tools;
    a step-decoding module, installed in the computer, being to read the NC program and obtain a plurality of tool demands from the plurality of sequential machining steps, converting the plurality of tool demands into a plurality of corresponding stepwise tool-demanding strings having a plurality of section codes, wherein the plurality of tool demands include numbered tool holder, types, specifications, tip directions and postures of the cutting tools, and each of the plurality of section codes of the tool-assembling strings corresponds to one of the section codes of the stepwise tool-demanding strings; and a matching and comparing module, installed in the computer, being to perform matching upon the plurality of tool-assembling strings and the plurality of stepwise tool-demanding strings, further to generate and output a plurality of corresponding step-and-tool matching strings by:
- for each respective stepwise tool-demanding string of the plurality of stepwise tool-demanding strings, retrieving, from the plurality of section codes of the respective stepwise tool-demanding string, a tool holder section code representing a tool holder number of one of the plurality of numbered tool holders;
- determining, among the plurality of tool-assembling strings, whether any of the plurality of tool-assembling strings has a corresponding tool holder section code representing the same tool holder number;
- in response to determining that a respective tool-assembling string of the plurality of tool-assembling strings has the corresponding tool holder section code representing the same tool holder number, calculating differences between the other section codes of the respective tool-assembling string and the corresponding section codes of the respective stepwise tool-demanding string, and integrating the differences to obtain a respective step-and-tool matching string of the plurality of step-and-tool matching strings; and
- outputting the plurality of step-and-tool matching strings.

9. The matching recognition system for an NC program and corresponding cutting tools of claim 8, wherein the plurality of tool-assembling strings and the plurality of stepwise tool-demanding strings are digits.

10. The matching recognition system for an NC program and corresponding cutting tools of claim 9, wherein a mathematical method is applied to calculate the differences between the plurality of tool-assembling strings and the plurality of stepwise tool-demanding strings for obtaining the plurality of step-and-tool matching strings.

11. The matching recognition system for an NC program and corresponding cutting tools of claim 8, wherein the plurality of 2-dimensional images experience a binarization treatment to obtain the plurality of analyzed results.

12. The matching recognition system for an NC program and corresponding cutting tools of claim 8, wherein the computer is a controller.

13. The matching recognition system for an NC program and corresponding cutting tools of claim 8, wherein:
- when all of the differences of the plurality of step-and-tool matching strings are 0, all of the cutting tools on the machine tool match needs of the NC program; and
- when at least one of the differences of the plurality of step-and-tool matching strings is not 0, at least one of the cutting tools on the machine tool does not match the needs of the NC program.

14. The matching recognition system for an NC program and corresponding cutting tools of claim 8, wherein a specific section code of the plurality of section codes of the plurality of stepwise tool-demanding strings includes a designated symbol to indicate that the step-decoding module does not analyze the specific section code.

* * * * *